United States Patent
Watanabe et al.

(10) Patent No.: US 11,941,284 B2
(45) Date of Patent: Mar. 26, 2024

(54) MANAGEMENT SYSTEM, QoS VIOLATION DETECTION METHOD, AND QoS VIOLATION DETECTION PROGRAM

(71) Applicant: Hitachi, Ltd., Tokyo (JP)

(72) Inventors: Soichi Watanabe, Tokyo (JP); Akira Deguchi, Tokyo (JP); Kazuei Hironaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 17/693,169

(22) Filed: Mar. 11, 2022

(65) Prior Publication Data

US 2023/0022502 A1    Jan. 26, 2023

(30) Foreign Application Priority Data

Jul. 20, 2021 (JP) ................. 2021-119576

(51) Int. Cl.
G06F 3/06 (2006.01)

(52) U.S. Cl.
CPC .......... *G06F 3/0653* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 10,254,970 | B1* | 4/2019 | Martin | G06F 3/061 |
| 2009/0150542 | A1 | 6/2009 | Yahiro et al. | |
| 2012/0317358 | A1* | 12/2012 | Ando | G06F 3/067 |
| | | | | 711/E12.002 |
| 2014/0130055 | A1* | 5/2014 | Guha | G06F 9/5011 |
| | | | | 718/104 |
| 2015/0199136 | A1* | 7/2015 | Faulkner | G06F 3/0689 |
| | | | | 711/114 |

FOREIGN PATENT DOCUMENTS

JP       2009-145962 A     7/2009

* cited by examiner

*Primary Examiner* — Sanjiv Shah
*Assistant Examiner* — Alexander J Yoon
(74) *Attorney, Agent, or Firm* — PROCOPIO, CORY, HARGREAVES & SAVITCH LLP

(57) ABSTRACT

It is possible to reduce analysis cost of a management system.
The management system includes a CPU and manages one or more storage devices that provide, to a higher-level device, one or more volumes for inputting and outputting data. The CPU is configured to collect performance information of the volume from the storage device at a predetermined first time interval and detect a QoS violation of the performance information of the volume at a second time interval longer than the first time interval.

9 Claims, 20 Drawing Sheets

FIG. 6

| DEVICE SERIAL NUMBER 63a | DEVICE MODEL 63b | RESOURCE TYPE 63c | RESOURCE ID 63d | RELATED RESOURCE 63e | SPEC 63f | QoS LOWER LIMIT (IOPS) 63g | QoS LOWER LIMIT (MB/s) 63h | ATTRIBUTE 63i |
|---|---|---|---|---|---|---|---|---|
| 001 | MODEL A | VOLUME | VOL1 | POOL1 | 1TB | 1000 | 10 | |
| | | | VOL2 | POOL2 | 5TB | 100 | - | COMPRESSION |
| | | | VOL3 | POOL2 | 5TB | - | 10 | COPY(VOL4) |
| | | | ... | | | | | |
| | | ... | | | | | | |

| ORGANIZATION ID | DEVICE SERIAL NUMBER | DEVICE MODEL | RESOURCE TYPE | RESOURCE ID | TIME | METRIC | VALUE |
|---|---|---|---|---|---|---|---|
| 1 | | | VOLUME | VOL1 | 10:00:00 | SequentialReadIOPS | 100 |
| | | | | | | SequentialWriteIOPS | 10 |
| | | | | | | RandomReadIOPS | 50 |
| | | | | | | RandomWriteIOPS | 40 |
| | | | | | | SequentialReadHitIOPS | 10 |
| | | | | | | RandomReadHitIOPS | 5 |
| | | | | | | ReadResponseTime | 200 |
| | | | | | | WriteResponseTime | 100 |
| | | | | | | SequentialReadTransferRate | 300 |
| | | | | | | SequentialWriteTransferRate | 100 |
| | | | | | | RandomReadTransferRate | 50 |
| | | | | | | RandomWriteTransferRate | 50 |
| | | | | | | ... | 40 |
| | | | | VOL2 | | | |
| | | | | ... | | | |
| | ... | ... | ... | | | | |
| ... | | | | | | | |

| ORGANIZATION ID (22a) | DEVICE SERIAL NUMBER (22b) | DEVICE MODEL (22c) | RESOURCE TYPE (22d) | RESOURCE ID (22e) | RELATED RESOURCE (22f) | SPEC (22g) | QoS LOWER LIMIT (IOPS) (22h) | QoS LOWER LIMIT (MB/s) (22i) | ATTRIBUTE (22j) |
|---|---|---|---|---|---|---|---|---|---|
| 1 | 001 | MODEL A | VOLUME | VOL1 | POOL1 | 1TB | 1000 | 10 | |
| | | | | VOL2 | POOL2 | 5TB | 100 | - | COMPRESSION |
| | | | | VOL3 | POOL2 | 5TB | - | 10 | COPY (VOL4) |
| | | | | ... | | | | | |
| | | | ... | | | | | | |

FIG. 10

| 23a | 23b | 23c | 23d | 23e | 23f | 23g | 23h | 23i |
|---|---|---|---|---|---|---|---|---|
| ORGANIZATION ID | DEVICE SERIAL NUMBER | DEVICE MODEL | RESOURCE TYPE | RESOURCE ID | TIME | METRIC | FREQUENCY INTERVAL | FREQUENCY |
| 1 | | | VOLUME | VOL1 | 20XX/ JANUARY | IOPS | 0-100 | 10 |
| | | | | | | | 100-200 | 10 |
| | | | | | | | 200-300 | 50 |
| | | | | | | | 300-400 | 40 |
| | | | | | | | 400-500 | 10 |
| | | | | | | | ... | ... |
| | | | | | | MB/s | 0-10 | 10 |
| | | | | | | | 10-20 | 25 |
| | | | | | | | 20-30 | 35 |
| | | | | | | | 30-40 | 40 |
| | | | | | | | 40-50 | 10 |
| | | | | | | | ... | ... |
| | | | | VOL2 | | | | |
| | | | | ... | | | | |
| | ... | ... | ... | | | | | |
| ⋮ | | | | | | | | |

FIG. 11

| ID (24a) | ORGANIZATION CODE (24b) | TYPE (24c) | NAME (24d) |
|---|---|---|---|
| 1 | Org1 | CUSTOMER | ABC |
| 2 | Org2 | CUSTOMER | DEF |
| 3 | Org3 | PARTNER | XYZ |
| ... | | | |

| | | | | | | | | 26 |
|---|---|---|---|---|---|---|---|---|
| 26a | 26b | 26c | 26d | 26e | 26f | 26g | 26h | 26i |

| ID | ORGANIZATION ID | DEVICE SERIAL NUMBER | DEVICE MODEL | RESOURCE TYPE | RESOURCE ID | REFERENCE VALUE | STATISTICAL INFORMATION GENERATION PERIOD | DETECTION PERIOD |
|---|---|---|---|---|---|---|---|---|
| 1 | 1 | 001 | MODEL A | VOLUME | 1 | MEDIAN | 1DAY | 5DAYS |
| 2 | 2 | | | | | | | |
| ... | | | | | | | | |

FIG. 14

| ID | ORGANIZATION ID | DEVICE SERIAL NUMBER | DEVICE MODEL | RESOURCE TYPE | RESOURCE ID | LOWER LIMIT (IOPS) | LOWER LIMIT (MB/S) | ABNORMALITY DETECTION TIME | SOLVED |
|---|---|---|---|---|---|---|---|---|---|
| 1 | 1 | 001 | MODEL A | VOLUME | 1 | 100 | – | 2021/2/1 | YES |
| 2 | 2 | 001 | MODEL A | VOLUME | 2 | 1000 | 20 | 2021/2/1 | NO |
| ... | | | | | | | | | |

MANAGEMENT SYSTEM, QoS VIOLATION DETECTION METHOD, AND QoS VIOLATION DETECTION PROGRAM

BACKGROUND

The present invention relates to a technique for detecting a Quality of Service (QoS) violation in one or more storage devices that provide one or more volumes.

In recent years, there is tendency to automate operation management in order to reduce the operation cost of computer systems and the like. For storage devices, techniques have been provided, which improve or facilitate operation management by collecting, analyzing, and handling configuration information and operation information. Particularly, expertise are required to monitor performance loads and take appropriate measures in the operation management of storage devices, and thus various techniques that facilitate the operation management have been disclosed.

One of performance problems with storage is a QoS violation. The QoS violation occurs when a particular volume becomes overloaded, occupies a lot of resources in a storage device, and thus causes a reduction in the performance of other volumes. Therefore, to detect this QoS violation, it is necessary to monitor a performance load of the volume in the storage device and detect an abnormality of the performance load.

Regarding a method for monitoring the performance of the storage device, to reliably detect a performance problem, it is necessary to monitor a performance load of a resource in the storage device with high time resolution (short time interval). However, as the scale of a system increases, the amount of information to be monitored increases. This is not preferable from the viewpoint of the storage capacity for managing information and the analysis cost of a management system.

To handle this problem, Japanese Unexamined Patent Application Publication No. 2009-145962 discloses a method for automatically adjusting a subject from which performance information is to be acquired and the frequency of the acquisition based on information monitored by management software during monitoring of a computer system including a storage device.

However, the technique disclosed in Japanese Unexamined Patent Application Publication No. 2009-145962 is the invention for adjusting a subject from which performance information is acquired from a storage device and the frequency of the acquisition. The analysis cost such as a processing load on the management system side that detects performance problems based on the information is not taken into consideration. Considering the case where a management system monitors a plurality of storage devices in a plurality of data centers, the analysis cost for detecting a performance problem becomes a serious problem.

Consider the case when a management system using an application provided by a cloud provider on a pay-as-you-go platform is used, there is a problem that the pay-as-you-go amount increases as the amount of data and the analysis cost increase, and the operating cost increases.

The present invention has been made in view of the above-described circumstances and an object of the present invention is to provide a technique for reducing analysis cost in a management system.

SUMMARY

To achieve the above-described object, a management system according to an aspect includes a processor and manages one or more storage devices that provide, to a higher-level device, one or more volumes for inputting and outputting data. The processor collects performance information of the one or more volumes from the one or more storage devices at a first time interval and detects a QoS violation of the performance information of the one or more volumes at a second time interval longer than the first time interval.

According to the present invention, it is possible to reduce analysis cost in the management system.

BRIEF DESCRIPTION OF THE DRAWINGS

FIG. 6 is a configuration diagram of a configuration information table according to the embodiment.

FIG. 8 is a configuration diagram of an operation history information table according to the embodiment.

FIG. 9 is a configuration diagram of a device configuration information table according to the embodiment.

FIG. 10 is a configuration diagram of a device statistical information table according to the embodiment.

FIG. 11 is a configuration diagram of an organization information table according to the embodiment.

FIG. 13 is a configuration diagram of a detection information table according to the embodiment.

FIG. 14 is a configuration diagram of an event information table according to the embodiment.

DETAILED DESCRIPTION

Figure 1:
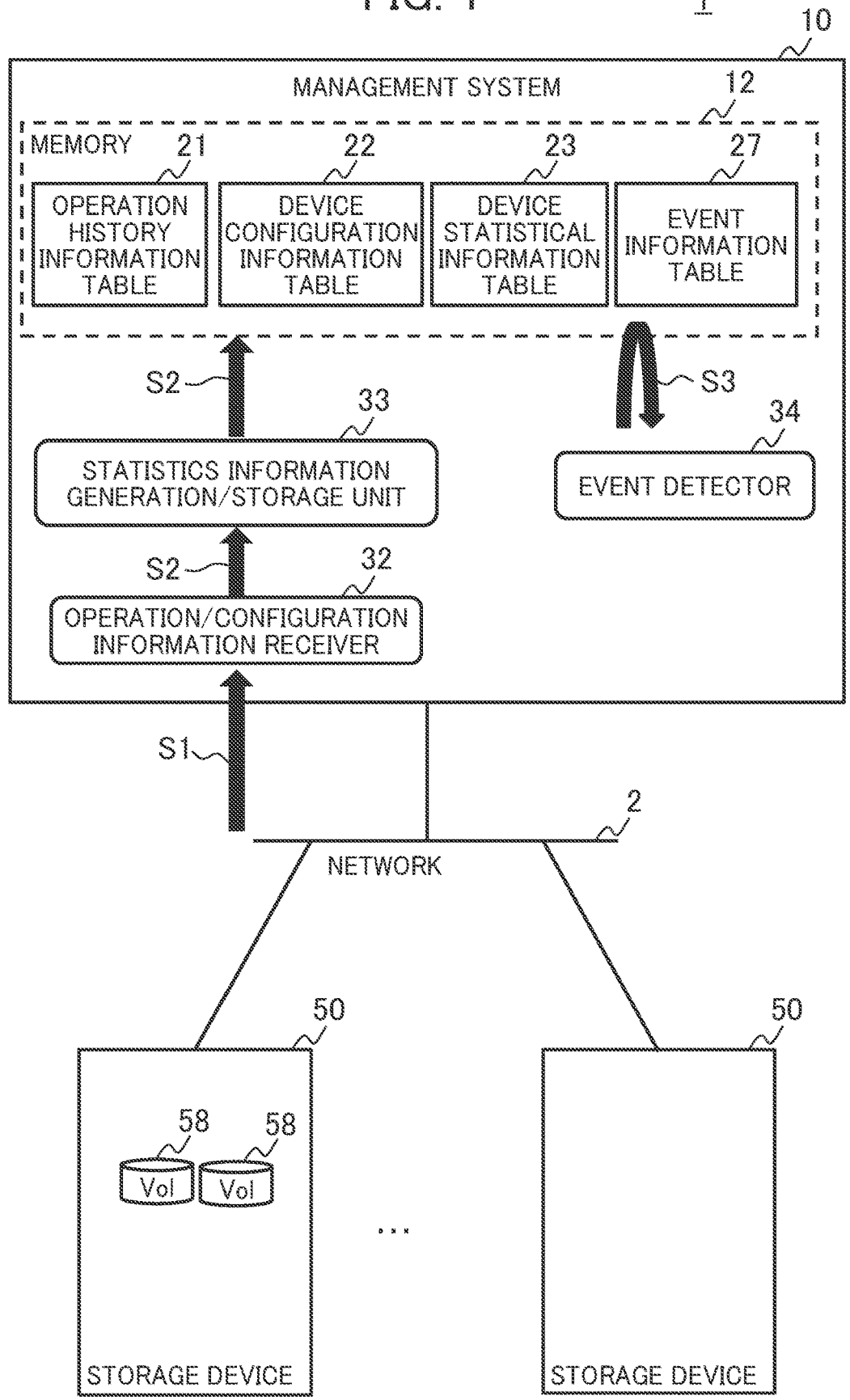
FIG. 1 is a diagram describing an overview of an embodiment.

An embodiment is described with reference to the drawings. The embodiment described below does not limit the invention described in the appended claims, and not all components described in the embodiment and combinations of the components are essential to the solution of the invention.

Configurations and processes that are described below and illustrated in the drawings indicate an overview of the embodiment to the extent necessary for understanding and implementing the present invention and are not intended to limit the embodiment of the present invention. In addition, some or all of the embodiment and modifications can be combined within a consistent range without departing from the gist of the present invention.

Hereinafter, similar components with signs distinguished by suffixes or branch numbers added to a number may be collectively referred to using the number regardless of the suffixes or branch numbers. For example, components with signs "100a" and "100b" or "200-1" and "200-2" may be collectively referred to using a sign "100" or "200". In addition, similar components with signs having suffixes or branch numbers may be collectively referred to using only a common part of names of the components and a sign with only a number. For example, an "XX interface 14a" and a "YY interface 14b" may be collectively referred to as "interface 14".

Hereinafter, various types of information are described as a table format. However, the information is not limited to the table format and may be in a document format or another format. In addition, configurations of tables are an example and the tables can be integrated and divided as needed. In addition, hereinafter, IDs and names that are used as items (columns) of the tables may be numbers or character strings as long as records can be distinguished from each other.

In addition, hereinafter, a process may be explained using a "program" as a main operation subject. The program is executed by a processor (for example, a central processing unit (CPU)) to perform a defined process using a storage resource (for example, a memory) and/or a communication interface device (for example, a communication port). Therefore, the main operation subject of the process may be the processor. The process explained using the program as the main operation subject may be performed by the processor or a device having the processor.

In addition, the processor may include a hardware circuit that performs a part of the process or the overall process. The program may be installed in each controller from a program source. The program source may be a program distribution computer or a computer-readable recording medium.

Overview of Embodiment

FIG. 1 is a diagram describing the overview of the embodiment.

A computer system 1 according to the embodiment includes one or more storage devices 50 and a management system 10. The storage device 50 includes a volume 58 to be monitored. The volume 58 is provided to receive and output data from and to a higher-level device (not illustrated). The storage device 50 and the management system 10 are communicably connected to each other via a network 2.

The management system 10 is configured on a cloud that provides a pay-as-you-go platform provided by a cloud provider. The management system 10 includes an operation/configuration information receiver 32, a statistical information generation/storage unit 33, an event detector 34, and a memory 12. The memory 12 stores an operation history information table 21, a device configuration information table 22, a device statistical information table 23, and an event information table 27. The management system 10 also includes components other than the aforementioned units. The components are described later in detail.

In the computer system 1, a process (operation/configuration information collection process) of collecting, from each storage device 50, configuration information, operation information, and the like of the storage device 50 is performed (step S1). Specifically, the operation/configuration information receiver 32 collects, from the storage device 50, the configuration information (including QoS set value that is IO configuration information for each volume) and the operation information of the storage device 50.

Next, the statistical information generation/storage unit 33 generates statistical information based on the operation information collected in step S1 and the configuration information collected in step S1 and stores the operation information, the configuration information, and the statistical information in the operation history information table 21, the device configuration information table 22, and the device statistical information table 23 (step S2). A method for generating the statistical information is described later.

Next, the event detector 34 detects an event based on information stored in the operation history information table 21, the device configuration information table 22, and the device statistical information table 23 (step S3). In this case, the "event" means that information that is about a subject to be monitored and is stored in the operation history information table 21, the device configuration information table 22, and the device statistical information table 23 matches a predetermined detection condition. The predetermined detection condition is, for example, a condition for detecting the occurrence of a "QoS violation" in the storage device 50. The condition for detecting the QoS violation is described later in detail. The "QoS violation" is that a performance value of a specific volume 58 in the storage device 50 is generally below a QoS set value (lower limit). The fact that the performance value is generally below the QoS set value (lower limit) means that the performance value is below the QoS set value, except for a sudden temporary case.

Overall Configuration

Figure 2:
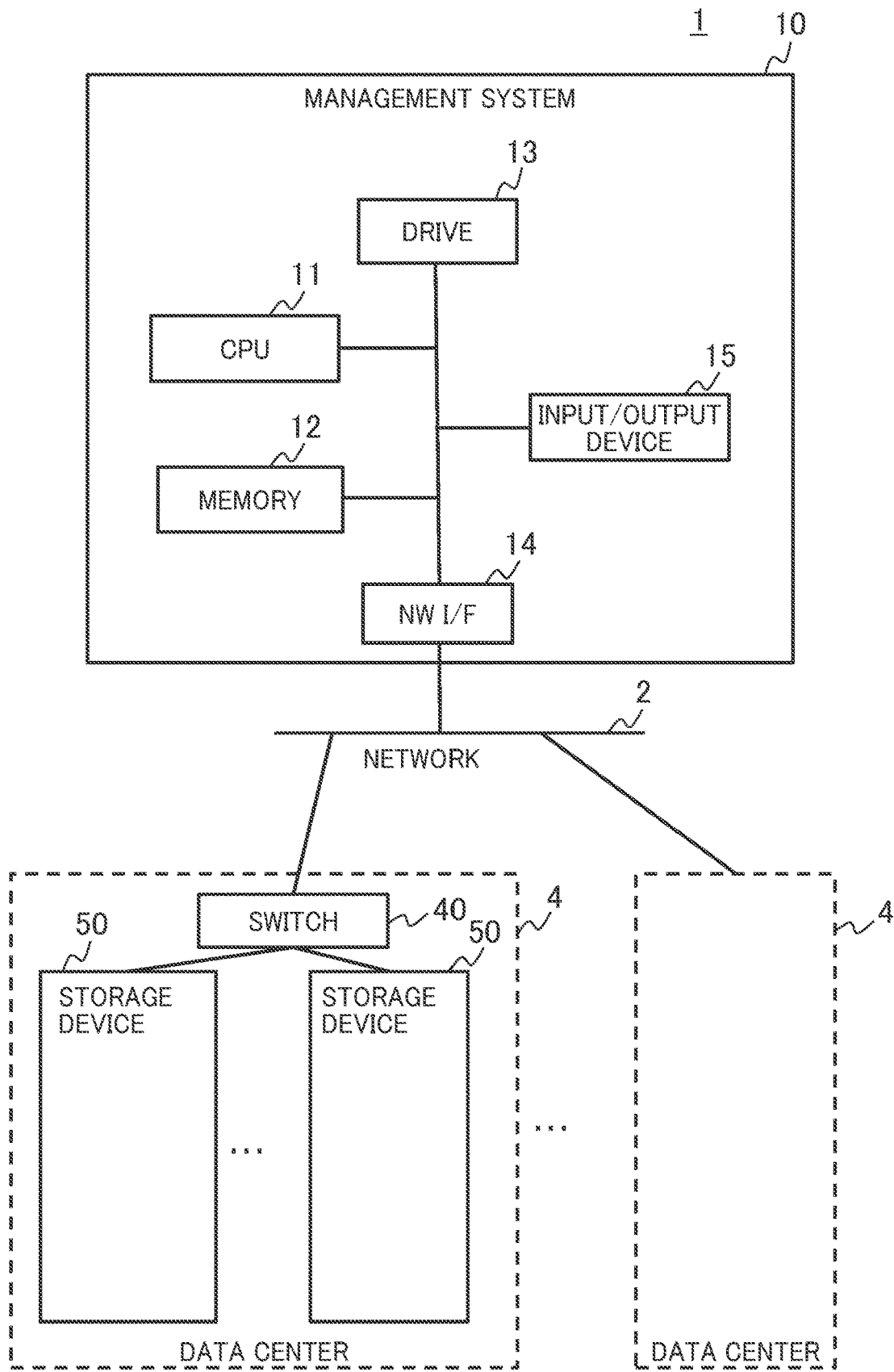
FIG. 2 is a diagram illustrating an example of an overall configuration of a computer system according to the embodiment.

FIG. 2 is a diagram illustrating an example of an overall configuration of the computer system according to the embodiment.

The computer system 1 includes the management system 10 and one or more data centers 4. The management system 10 is connected to a device of the data center 4 via the network 2 outside the data center 4.

The data center 4 includes one or more storage devices 50. In one data center 4, a plurality of storage devices 50 are connected to each other via a network (not illustrated) included in the data center 4. The data center 4 may include a switch 40 for connecting the network within the data center 4 to the network 2 outside the data center 4. The switch 40 may not be required. The network within the data center 4 and the network 2 outside the data center 4 may conform to the same protocol. These networks may have a redundant configuration. In addition, these networks may be Ethernet (registered trademark) networks, InfiniBand networks, wireless networks, or the like. The number of data centers 4 in the computer system 1 and the number of storage devices 50 in each data center 4 may be arbitrary.

The management system 10 holds management information of the storage device 50 and a program for operating the storage device 50. The management system 10 may be a personal computer (PC) or a computer such as a server device, for example. For example, the management system 10 collects information from the storage device 50 via the program, executes processing, displays the management information to a user (administrator) via a graphical user interface (GUI), and transmits an operation request entered by the administrator to the storage device 50. In the present embodiment, the single management system 10 is configured to collectively manage the plurality of storage devices 50 included in all the data centers 4. However, for example, the computer system 1 may include a plurality of management systems 10, and each of the management systems 10 may be configured to manage the storage devices 50 of each of the data centers 4.

In the present embodiment, the volumes 58 included in the storage devices 50 are subjects to be monitored. However, the embodiment is not limited thereto. Any resource such as a virtual machine (VM) of a host (not illustrated) that accesses data may be a subject to be monitored.

The management system 10 includes, for example, a CPU 11 as an example of a processor, the memory 12, a drive 13, a network interface (I/F) 14, and an input and output device 15.

The network I/F 14 is, for example, an interface with a wired LAN card, a wireless LAN card, or the like and communicates with another device (for example, the storage devices 50) via the network 2.

The input and output device 15 includes an input device and a display device, for example. The input device is a mouse, a keyboard, or the like and receives an entry of information by the administrator of the management system 10. The display device is a display or the like and displays and outputs various types of information.

The CPU 11 executes various types of processing in accordance with a program stored in the memory 12 and/or the drive 13.

The memory 12 is, for example, a random access memory (RAM) and stores the program to be executed by the CPU 11 and necessary information. The program and the information stored in the memory 12 are described later.

The drive 13 is an example of a storage device. For example, the drive 13 may be a hard disk drive (HDD), a solid state drive (SSD), another nonvolatile memory (for example, a storage class memory (SCM)), or the like. The drive 13 stores the program to be executed by the CPU 11 and data to be used by the CPU 11.

Next, each of the storage devices 50 is described in detail.

Figure 3:
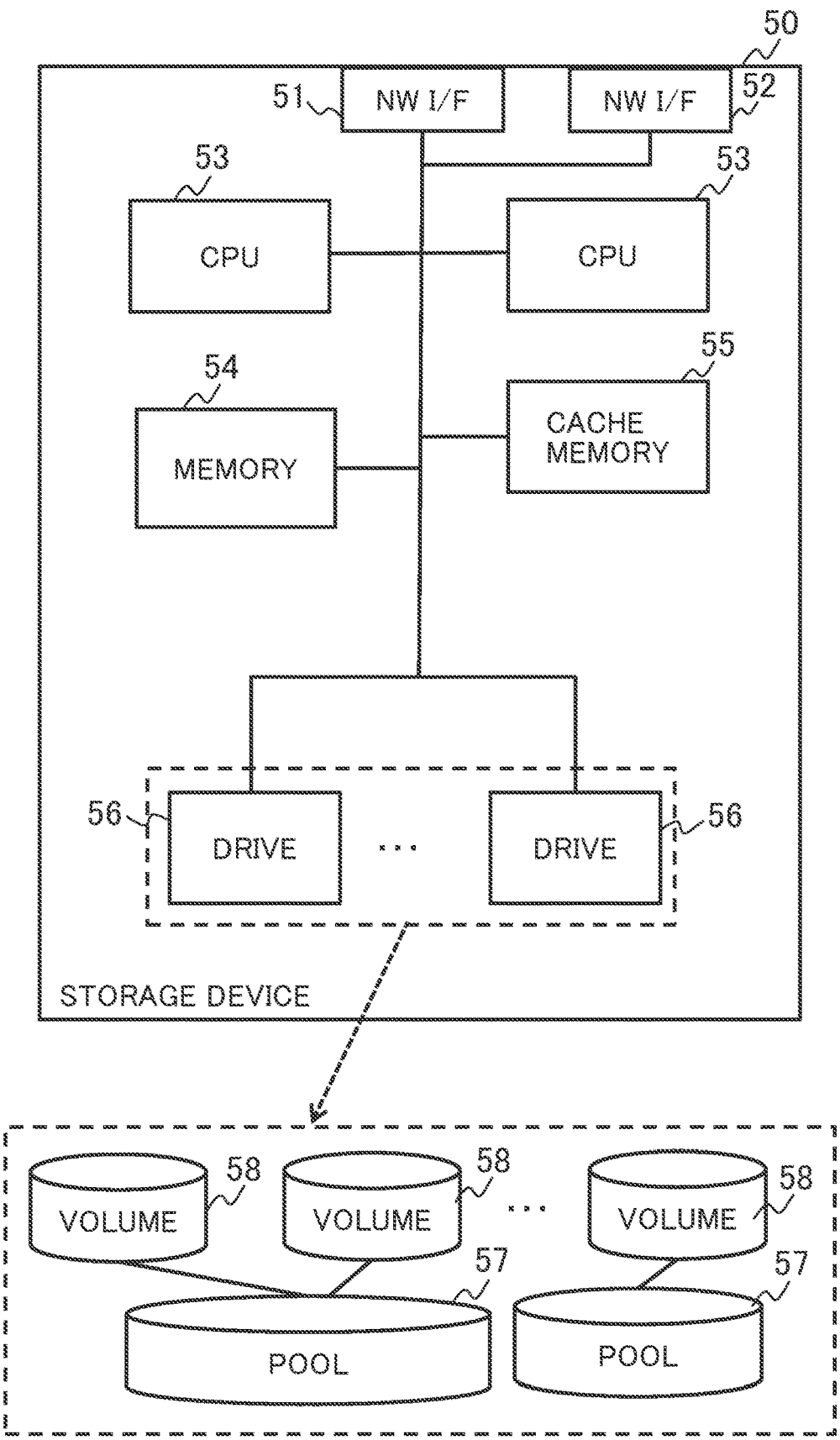
FIG. 3 is a diagram illustrating an example of a configuration of a storage device according to the embodiment.

FIG. 3 is a diagram illustrating an example of a configuration of the storage device according to the embodiment.

The storage device 50 includes a plurality of CPUs 53, a memory 54, a cache memory 55, a plurality of drives 56, and network I/Fs 51 and 52. The memory 54 is an example of a storage device. Each of the network I/Fs 51 and 52 is an example of a communication interface device. These units are connected to each other via a bus. The memory 54 and the cache memory 55 may not be physically separated from each other. Physical regions of common memory modules of the memory 54 and the cache memory 55 may be logically divided and used as a memory region and a cache memory region. In addition, the number of CPUs 53 and the number of memories 54 are not limited to the numbers exemplified in FIG. 3. In addition, the number of drives 56 may be arbitrary. Furthermore, the number of network I/Fs 51 and 52 is not limited to the number exemplified in FIG. 3.

The network I/F 51 is an interface connected to the network within the data center 4, In the present embodiment, since the network within the data center 4 and the network 2 are connected to each other via the switch 40, the storage device 50 can communicate with the management system 10 via the network I/F 51.

The network I/F 52 is an interface connected to an input/output (I/O) data network (not illustrated) connected to the higher-level device (host not illustrated). The network I/Fs 51 and 52 may be interfaces conforming to Fibre Channel, Ethernet, or the like. When the network within the data center 4 and the I/O data network are the same, the network I/Fs may be of one type.

The CPUs 53 execute various types of processing in accordance with a program stored in the memory 54 and/or the drive 56. Each of the CPUs 53 may include a plurality of cores.

The memory 54 is, for example, a RAM and stores the program to be executed by the CPUs 53 and necessary information. The program and the information that are stored in the memory are described later.

The cache memory 55 provides a region for temporarily caching data in order to access data managed by the drive 56 at a high speed.

The drive 56 is an example of a storage device. For example, the drive 56 may be an HDD, an SSD, another nonvolatile memory (for example, an SCM), or the like. The drive 56 stores various data to be used by the higher-level device.

The storage device 50 includes a pool 57 as a logical region in which storage regions of the plurality of drives 56 are virtually bundled. The storage device 50 provides, as a region for storing data for the higher-level device, a volume 58 to which a storage region of the pool 57 is allocated. The higher-level device can read and write data by accessing the volume 58. The number of pools 57 in the storage device 50 and the number of volumes 58 in the storage device 50 are not limited to numbers exemplified in FIG. 3.

Figure 4:
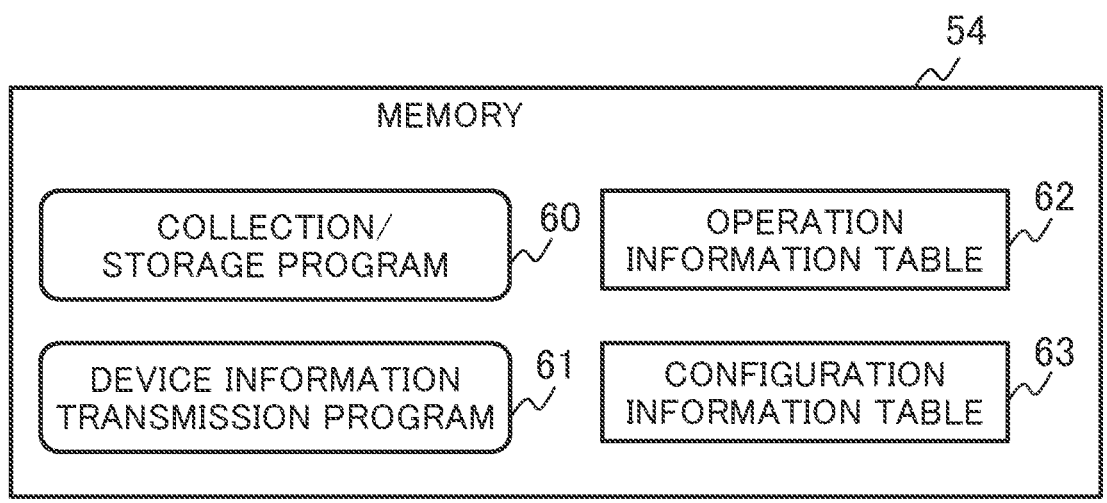
FIG. 4 is a configuration diagram of a memory of the storage device according to the embodiment.

FIG. 4 is a configuration diagram of the memory of the storage device according to the embodiment.

The memory 54 stores a collection/storage program 60, a device information transmission program 61, an operation information table 62, and a configuration information table 63.

The collection/storage program 60 is executed by the CPUs 53 to periodically collect an amount of I/O caused by input/output (I/O) processing executed in the storage device 50 or the like, an amount of data transferred, and an amount of each resource used in the storage device 50 and cause the collected information to be stored in the operation information table 62. In addition, the collection/storage program 60 converts at least a part of the operation information (performance information) stored in the operation information table 62 into a value (evaluation value) to be used for evaluation. The information converted to the evaluation value is also operation information.

The device information transmission program 61 is executed by the CPUs 53 to transmit the operation information based on the operation information table 62 held in the storage device 50 and information of the configuration information table 63 to the management system 10 periodically (for example, every 5 minutes), for example.

The operation information table 62 holds the operation information (performance information) of the storage device 50. The configuration information table 63 holds configuration information of the storage device 50.

Figure 5:
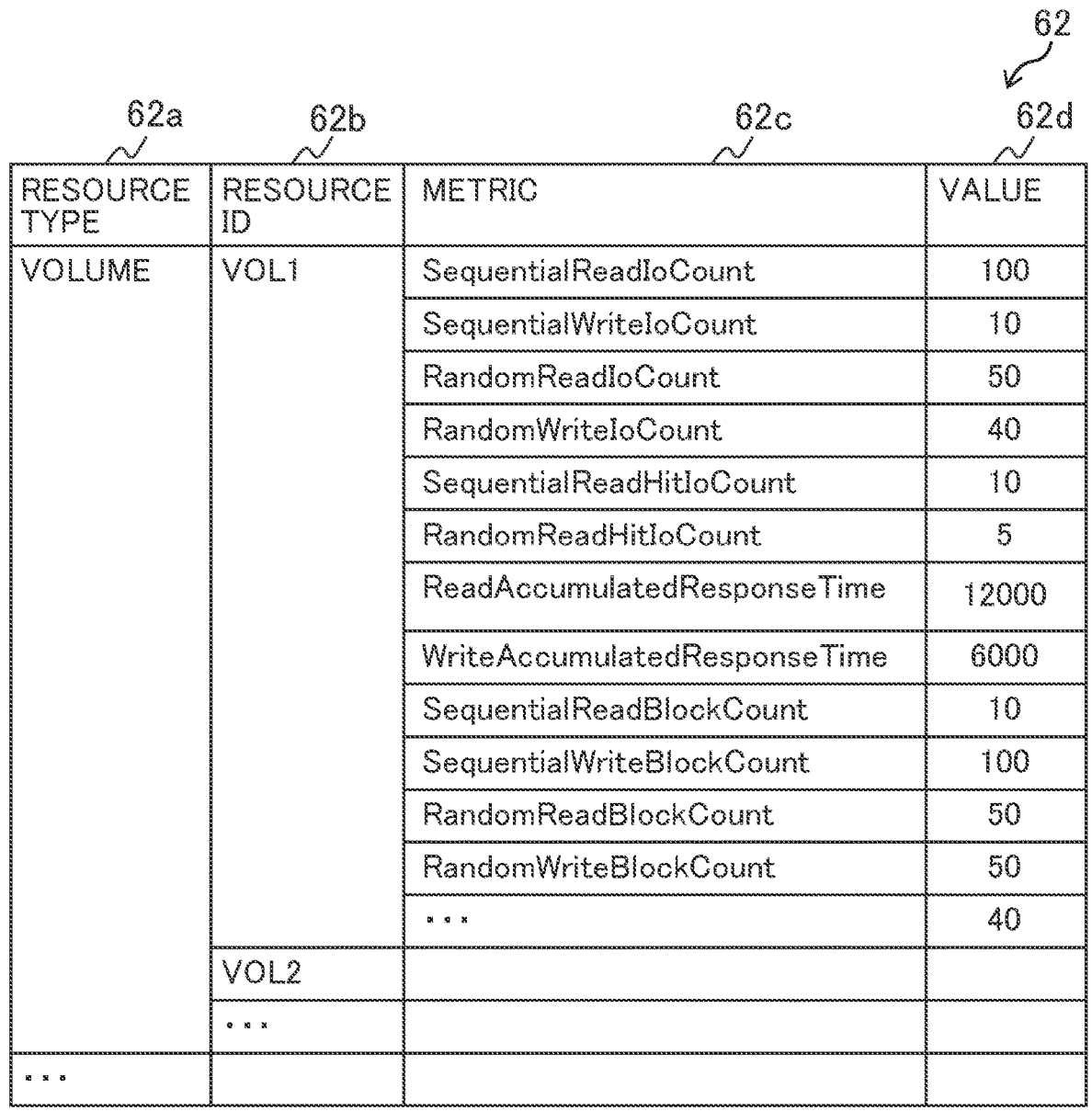
FIG. 5 is a configuration diagram of an operation information table according to the embodiment.

FIG. 5 is a configuration diagram of the operation information table according to the embodiment.

The operation information table 62 includes items of a resource type 62a, a resource ID 62b, a metric 62c, and a value 62d.

In the resource type 62a, a type (resource type) of a resource included in the storage device 50 is stored. Examples of the resource type is a volume, a pool, and the like to be monitored for QoS violation detection. In the resource ID 62b, an identifier (resource ID) that can identify the resource among resources corresponding to resource types is stored.

In the metric 62c, a metric necessary for calculation in the QoS violation detection is stored. The metric may include SequentialReadIoCount that is the number of times of read I/O in sequential access, SequentialWriteIoCount that is the number of times of write I/O in sequential access, RandomReadIoCount that is the number of times of read I/O in random access, RandomWriteIoCount that is the number of times of write I/O in random access, SequentialReadHitIoCount that is the number of cache hits at the time of read I/O in sequential access, RandomReadHitIoCount that is the number of cache hits at the time of read I/O in random access, ReadAccumulatedResponseTime that is a cumulative read I/o response time from a given point in time, WriteAccumulatedResponseTime that is a cumulative write I/O response time from a given point in time, SequentialReadBlockCount that is the number of blocks from which data has been read in sequential access, SequentialWriteBlockCount that is the number of blocks to which data has been written in sequential access, RandomReadBlockCount that is the number of blocks from which data has been read in random access, RandomWriteBlockCount that is the number of blocks to which data has been written in random access, and the like. The metric regarding the volume is not limited to them.

The collection/storage program 60 calculates IOPS (input/output per second) corresponding to each value of IoCount by dividing the difference between values of IoCount at two points in time by the difference between the two points in time. In the present embodiment, the calculated IOPS is transmitted by the device information transmission program 61 to the management system 10.

In addition, the collection/storage program 60 calculates ResponseTime (response time) corresponding to each value of AccumulatedResponseTime by dividing the difference between values of AccumulatedResponseTime (ReadAccumulatedResponseTime and WriteAccumulatedResponseTime) at two points in time by the difference between the two points in time. In the present embodiment, the calculated ResponseTime is transmitted by the device information transmission program 61 to the management system 10.

In addition, the collection/storage program 60 calculates each value of TransferRate (transfer rate) by dividing the difference between values of BlockCount (SequentialReadBlockCount, SequentialWriteBlockCount, RandomReadBlockCount, and RandomWriteBlockCount) at two points in time by the difference between the two points in time. In the present embodiment, the calculated TransferRate is transmitted by the device information transmission program 61 to the management system 10.

The storage device 50 may calculate an average value of cumulative values, causes the average value to be stored as a metric indicating the average value in the operation information table 62 and transmit, to the management system 10, the stored average value as it is.

In the value 62d, a value corresponding to each metric of the metric 62c is stored.

FIG. 6 is a configuration diagram of the configuration information table according to the embodiment.

The configuration information table 63 includes items of a device serial number 63a, a device model 63b, a resource type 63c, a resource ID 63d, a related resource 63e, a spec 63f, a QoS lower limit (IOPS) 63g, a QoS lower limit (MB/s) 63h, and an attribute 63i.

In the device serial number 63a, a device serial number indicating the storage device 50 is stored. In the device model 63b, a model name indicating a model of the storage device 50 is stored. In the resource type 63c, a type (resource type) of a resource included in the storage device 50 is stored. The resource type includes at least a volume type. In the resource ID 63d, an identifier (resource ID) of the resource is stored. In the related resource 63e, a resource ID of a resource (related resource) related to the resource is stored. When the resource is a volume, the related resource is a pool 57 that is the basis of the volume 58. Based on this information, the relationship between logical resources of the pool and the volume is recognized. In the spec 63f, specifications (size, rate, and the like) of the resource are stored. In the QoS lower limit (IOPS) 63g, a lower limit of QoS related to IOPS is stored. In the QoS lower limit (MB/s) 63h, a lower limit of QoS related to a transfer rate is stored. In the attribute 63i, an attribute of the resource is stored. When the resource is the volume, examples of the attribute of the resource are compression indicating that a compression function of the volume is valid, and a copy (volume ID of a copy destination) indicating that the volume is in a paired state. In the attribute 63i, a plurality of attributes may be stored for one resource.

Next, a configuration of the memory 12 of the management system 10 is described.

Figure 7:
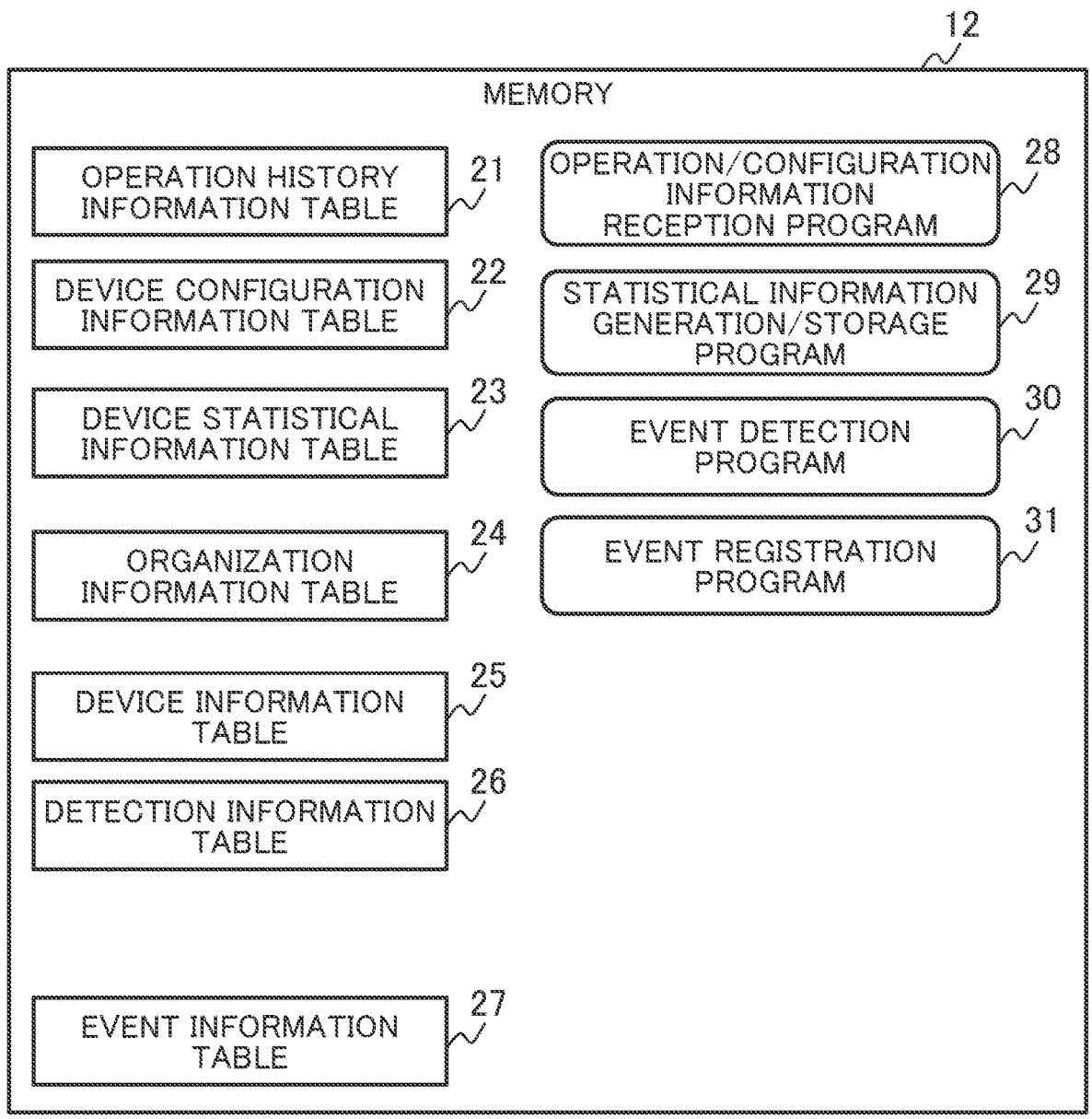
FIG. 7 is a configuration diagram of a memory of a management system according to the embodiment.

FIG. 7 is a configuration diagram of the memory of the management system according to the embodiment.

The memory 12 of the management system 10 stores the operation history information table 21, the device configuration information table 22, the device statistical information table 23, an organization information table 24, a device information table 25, a detection information table 26, the event information table 27, an operation/configuration information reception program 28, a statistical information generation/storage program 29, an event detection program 30, and an event registration program 31.

The operation history information table 21 holds time-series history information of operation information collected from the storage device 50 to be managed. The device configuration information table 22 holds configuration information of the storage device 50 to be managed. The device statistical information table 23 holds statistical information generated from the operation information and configuration information of the storage device 50 to be managed. The organization information table 24 holds information of an organization that uses the data center 4 and the storage device 50 of the data center 4. The device information table 25 holds information such as the status of the storage device 50 to be managed for each organization. The detection information table 26 holds information for detecting an event from the operation information of the storage device 50 to be managed. For example, the detection information table 26 holds information related to a configuration requirement for a predetermined detection condition for detecting an event. The event information table 27 holds information of the detected event. The tables are described later in detail.

The operation/configuration information reception program 28 is executed by the CPU 11 to communicate with the device information transmission program 61 of the storage device 50 and receive information from the storage device 50. The operation/configuration information receiver 32 is configured by the CPU 11 executing the operation/configuration information reception program 28.

The statistical information generation/storage program 29 is executed by the CPU 11 to generate statistical information from the information received by the operation/configuration information reception program 28 and causes the received information and the statistical information to be stored in the operation history information table 21, the device configuration information table 22, and the device statistical information table 23. The statistical information generation/storage unit 33 is configured by the CPU 11 executing the statistical information generation/storage program 29.

The event detection program 30 is executed by the CPU 11 to use the information of the operation history information table 21, the device configuration information table 22, the device statistical information table 23, the event information table 27, and the detection information table 26 to detect an event matching a predetermined condition. The event detector 34 is configured by the CPU 11 executing the event detection program 30.

When an event is detected by the event detection program 30, the event registration program 31 is called and executed by the CPU 11 and causes the detected event to be stored in the event information table 27.

FIG. 8 is a configuration diagram of the operation history information table according to the embodiment.

The operation history information table 21 is updated based on operation information periodically transmitted from the storage device 50.

The operation history information table 21 includes items of an organization ID 21a, a device serial number 21b, a device model 21c, a resource type 21d, a resource ID 21e, a time 21f, a metric 21g, and a value 21h.

In the organization ID 21a, an identifier (organization ID) of an organization that owns or manages the storage device 50 is stored. In the device serial number 21b, a device serial number of the storage device 50 is stored. In the device model 21c, a model name indicating a model of the storage device 50 is stored. In the resource type 21d, a type (resource type) of a resource included in the storage device 50 is stored. Examples of the resource type are a volume and a pool targeted for QoS violation detection. In the resource ID 21e, a resource ID that can identify the resource is stored. In the time 21f, a time (for example, a time when calculation is performed to covert a value of a metric managed in the storage device 50) corresponding to a value of the metric is stored.

In the metric 21g, the metric corresponding to the operation information is stored. The metric may include SeguentialReadIOPS that is IOPS of read I/O in sequential access, SequentialWriteIOPS that is IOPS of write I/O in sequential access, RandomReadIOPS that is IOPS of read I/O in random access, RandomWriteIOPS that is IOPS of write I/O in random access, SequentialReadHitIOPS that is IOPS of a cache hit of read I/O in sequential access, RandomReadHitIoCount that is IOPS of a cache hit of read I/O in random access, ReadResponseTime that is a response time of read I/O, WriteResponseTime that is a response time of write I/O, SequentialReadTransferRate that is a transfer rate at the time of reading in sequential access, SequentialWriteTransferRate that is a transfer rate at the time of writing in sequential access, RandomReadTransferRate that is a transfer rate at the time of reading in random access, RandomWriteTransferRate that is a transfer rate at the time of writing in random access, and the like. The metric regarding the volume is not limited to them.

In the value 21h, a value corresponding to the metric of the metric 21g is stored. The value corresponding to each metric is calculated using a value of a metric of the operation information table 62 illustrated in FIG. 5 as described above.

FIG. 9 is a configuration diagram of the device configuration information table according to the embodiment.

The device configuration information table 22 is updated based on device information periodically transmitted from the storage device 50. The management system 10 may request the storage device 50 to transmit the device information and may cause the storage device 50 to transmit the device information. The device configuration information table 22 includes items of an organization ID 22a, a device serial number 22b, a device model 22c, a resource type 22d, a resource ID 22e, a related resource 22f, a spec 22g, a QoS lower limit (IOPS) 22h, a QoS lower limit (MB/s) 22i, and an attribute 22j.

In the organization ID 22a, the identifier (organization ID) of the organization that owns or manages the storage device 50 is stored. In the device serial number 22b, the device model 22c, the resource type 22d, the resource ID 22e, the related resource 22f, the spec 22g, the QoS lower limit (IOPS) 22h, the QoS lower limit (MB/s) 22i, and the attribute 22j, the same information as that of the items having the same names as those of the items of the configuration information table 63 illustrated in FIG. 6 is stored.

FIG. 10 is a configuration diagram of the device statistical information table according to the embodiment.

The device statistical information table 23 stores statistical information generated based on the information of the operation history information table 21. The device statistical information table 23 includes items of an organization ID 23a, a device serial number 23b, a device model 23c, a resource type 23d, a resource ID 23e, a time 23f, a metric 23g, a frequency interval 23h, and a frequency 23i.

In the organization ID 23a, an organization ID of an organization that owns or manages the storage device 50 is stored. In the device serial number 23b, a device serial number of the storage device 50 is stored. In the device model 23c, a model name indicating a model of the storage device 50 is stored. In the resource type 23d, a resource type of a resource included in the storage device 50 is stored. Examples of the resource type are a volume and a pool targeted for QoS violation detection. In the resource ID 23e, a resource ID that can identify the resource is stored. In the time 23f, a time corresponding to the statistical information is stored. In the metric 23g, a metric of the statistical information is stored. Examples of the metric of the statistical information are IOPS and MB/s indicating a transfer rate. In the frequency interval 23h, a range of each interval (frequency interval) that serves as a delimiter for representing a value of the metric using a frequency is stored. In the frequency 23i, the number of times that the value of the metric is in the frequency interval of the frequency interval 23h in a predetermined time range for collecting the statistical information as statistics is stored.

FIG. 11 is a configuration diagram of the organization information table according to the embodiment.

The organization information table 24 stores an entry for each organization. The organization is an example of a group that manages a plurality of storage devices 50. The group is not limited to the organization and may be a tenant, each department of the organization, or a collection that does not have particular meaning. Each entry of the organization information table 24 is initially set when the organization starts operating the storage devices 50. An entry of the organization information table 24 includes items of an ID 24a, an organization code 24b, a type 24c, and a name 24d.

In the ID 24a, an organization ID indicating the organization associated with the entry is stored. In the organization code 24b, a code of the organization associated with the entry is stored. In the type 24c, a type indicating a type of the organization associated with the entry is stored.

Examples of the type are a customer and a partner. In the name 24d, the name of the organization associated with the entry is stored.

Figure 12:
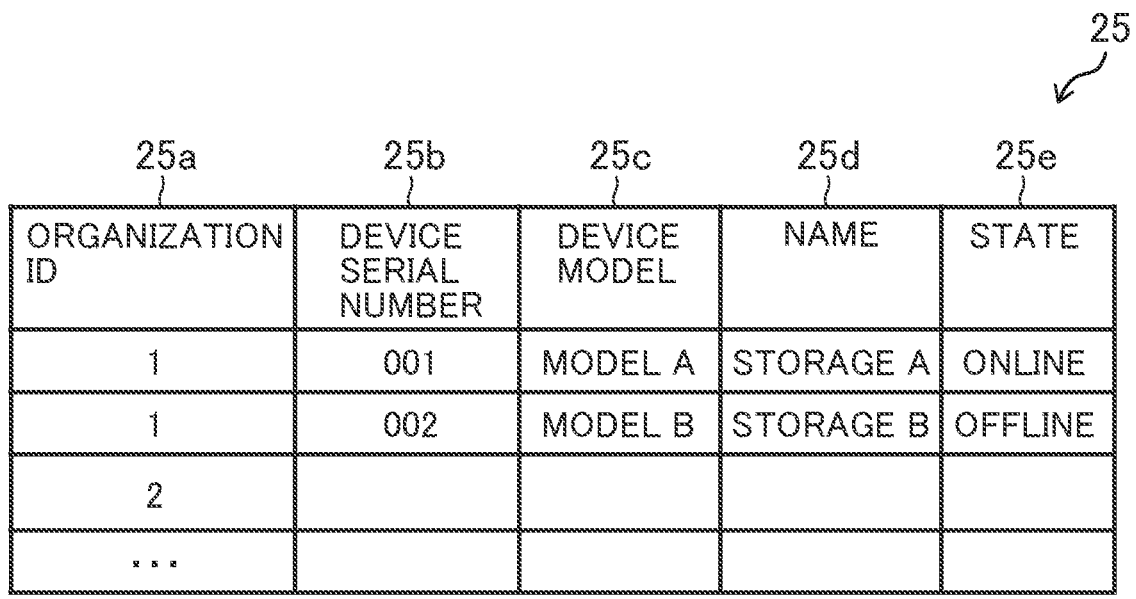
FIG. 12 is a configuration diagram of a device information table according to the embodiment.

FIG. 12 is a configuration diagram of the device information table according to the embodiment.

The device information table 25 stores information of a storage device 50 allocated to each organization. The device information table 25 is updated based on information periodically transmitted from the storage device 50. The management system 10 may request the storage device 50 to transmit the device information and may cause the storage device to transmit the information. An entry of the device information table 25 includes items of an organization ID 25a, a device serial number 25b, a device model 25c, a name 25d, and a state 25e.

In the organization ID 25a, an organization ID of the organization that owns or manages the storage device 50 is stored. In the device serial number 25b, a device serial number of the storage device 50 managed by the organization associated with the entry is stored. In the device model 25c, a model name of the storage device 50 associated with the entry is stored. In the name 25d, the name of the storage device 50 associated with the entry is stored. In the state 25e, the state of connection of the storage device 50 associated with the entry to the management system 10 is stored.

FIG. 13 is a configuration diagram of the detection information table according to the embodiment.

The detection information table 26 stores an entry for each content of detection of QoS violation. The entry of the detection information table 26 includes items of an ID 26a, an organization ID 26b, a device serial number 26c, a device model 26d, a resource type 26e, a resource ID 26f, a reference value 26g, a statistical information generation period 26h, and a detection period 26i.

In the ID 26a, an ID of a detection content associated with the entry is stored. In the organization ID 26b, an organization ID of an organization that owns or manages a storage device 50 is stored. In the device serial number 26c, a device serial number of the storage device 50 targeted for the detection content associated with the entry is stored. In the device model 26d, a model name of the storage device 50 associated with the entry is stored. In the resource type 26e, a type of a resource targeted for the detection content and included in the storage device 50 associated with the entry is stored. In the resource ID 26f, a resource ID that can identify the resource is stored. In the reference value 26g, a reference value to be used as a criterion for detecting QoS violation is stored. Examples of the reference value are a median, a mode (mode value), and an average value. In the statistical information generation period 26h, a statistical information generation period associated with the entry is stored. The statistical information generation period is described later. In the detection period 26i, a detection period serving as a condition for the occurrence of an abnormality for which an alert is provided is stored.

The statistical information generation period and the detection period are described below.

As a basic idea, a problem such as a QoS violation is that it is necessary to check long-term tendency rather than checking a momentary deviation. For the checking of the long-term tendency, a short-term variation in performance is noise. In the present embodiment, operation information within a certain time period is converted into statistical information, and robust tendency is determined for short-term noise based on the statistical information, and long-term tendency is determined after the determination of the robust tendency. To determine the long-term tendency, the detection period is used.

The statistical information generation period is a collection period for collecting operation information and converting the operation information into statistical information. For example, the operation information of the storage device is transmitted to the management system at predetermined transmission time intervals (for example, time intervals of 5 minutes). When the QoS violation detection is performed every time the management system collects the operation information, the operation history information in the memory or the drive of the management system is accessed to check the long-term tendency, an event is detected, and the detected event is registered. However, by performing these processes at the transmission time intervals, a process load (process cost) of the management system is increased.

To avoid this, the statistical information generation period (second time period of, for example, one day) that is longer than the transmission intervals is provided, statistical information for the statistical information generation period as a unit is generated, and the process load of the management system is reduced by performing a detection process based on the statistical information.

The detection period (third time interval) is a time period to be used to determine whether a QoS violation has long-term tendency. For example, when the detection period is set to 5 days, and a QoS violation is detected by a detection process based on the statistical information generation period (second time interval) and continues for a time period (equal to or longer than the detection period) of 5 days or more, it is determined that the QoS violation has long-term tendency.

In the example illustrated in FIG. 13, the statistical information generation period and the detection period are set for each of the storage devices 50, but may be values common to the storage devices 50. In addition, the statistical information generation period and the detection period may be fixed values or may not be fixed values. When the statistical information generation period and the detection period are fixed values, values defined in advance may be used. When the statistical information generation period and the detection period are not fixed values, values appropriate for the operation of the user may be set. In addition, the statistical information generation period and the detection period may be set before the operation and may be changed during the operation. Furthermore, appropriate values may be determined by machine learning or the like and set as the statistical information generation period and the detection period.

FIG. 14 is a configuration diagram of the event information table according to the embodiment.

The event information table 27 stores an entry for each detected event. The entry of the event information table 27 includes items of an ID 27a, an organization ID 27b, a device serial number 27c, a device model 27d, a resource type 27e, a resource ID 27f, a lower limit (IOPS) 27g, a lower limit (MB/s) 27h, an abnormality detection time 27i, and solved 27j.

In the ID 27a, an ID of the event associated with the entry is stored. In the organization ID 27b, an organization ID of an organization that owns or manages a storage device 50 in which the event has occurred is stored. In the device serial number 27c, a device serial number of the storage device 50 in which the event associated with the entry has occurred is stored. In the device model 27d, a model name of the storage device 50 in which the event has occurred is stored. In the resource 27*e*, a resource type of a resource included in the storage device 50 in which the event has occurred is stored. In the resource ID 27*f*, a resource ID of the resource in which the event has occurred is stored. In the lower limit (IOPS) 27*g*, a QoS lower limit related to IOPS for the resource in which the event has occurred is stored. In the lower limit (MB/s) 27*h*, a QoS lower limit related to a transfer rate for the resource in which the event has occurred is stored. In the abnormality detection time 27*i*, a time when a QoS abnormality has been detected is stored. In the solved 27*j*, information indicating whether a measure has been taken on the event and the event has been solved is stored. In the present embodiment, when the event is solved, Yes is stored in the solved 27*j*.

Next, a process of the computer system 1 according to the present embodiment is described.

The process of the computer system 1 can be roughly divided into three processes, a process of collecting, from each of the storage devices 50, information such as the configuration information and the operation information in the management system 10, a process of converting the collected operation information into statistical information and storing the statistical information in the management system 10, and a process of detecting an event from the collected operation information and the statistical information. As a process other than these processes, there is a process in which the collection/storage program 60 of the storage device 50 periodically collects the operation information (I/O and an amount of data transferred) and causes the collected operation information to be stored in the operation information table 62. However, for this process, any process can be performed. Therefore, the process is not illustrated.

First, the overall process of the computer system 1 is described.

Figure 15:
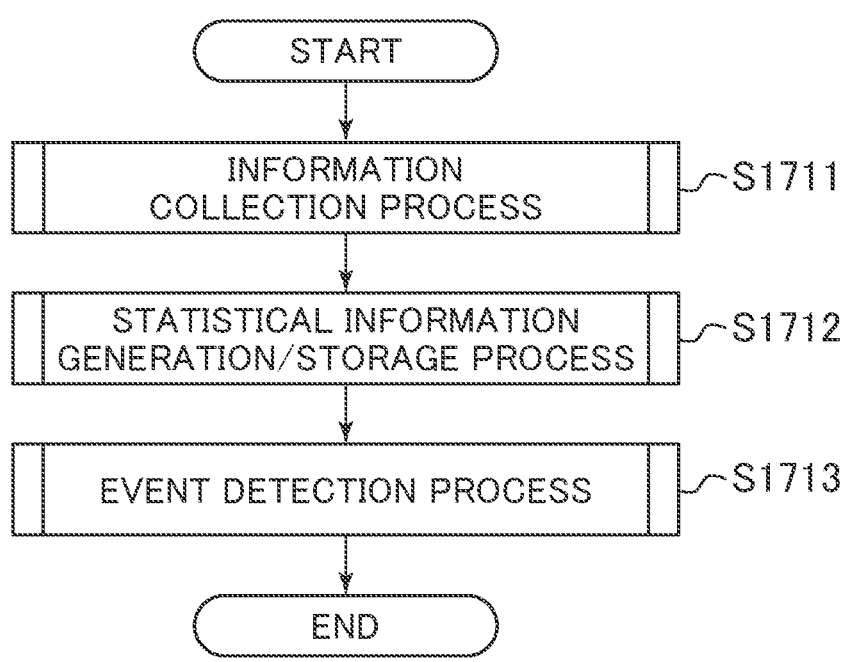
FIG. 15 is a flowchart of an overall process according to the embodiment.

FIG. 15 is a flowchart of the overall process according to the embodiment.

First, an information collection process of collecting information in the management system 10 from the storage device 50 is performed periodically (for example, at time intervals of 5 minutes) (step S1711).

Next, the management system 10 performs a statistical information generation/storage process of generating statistical information based on the information collected in step S1 and storing the collected information and the generated statistical information in the operation history information table 21, the device statistical information table 23, and the like (step S1712). The statistical information generation/storage process may be performed immediately after the information collection process or may be performed once for the information collection process performed a plurality of times.

Next, the management system 10 performs an event detection process of detecting an event (also referred to as QoS violation) (step S1713).

Next, the information collection process (step S1711) is described in detail.

Figure 16:
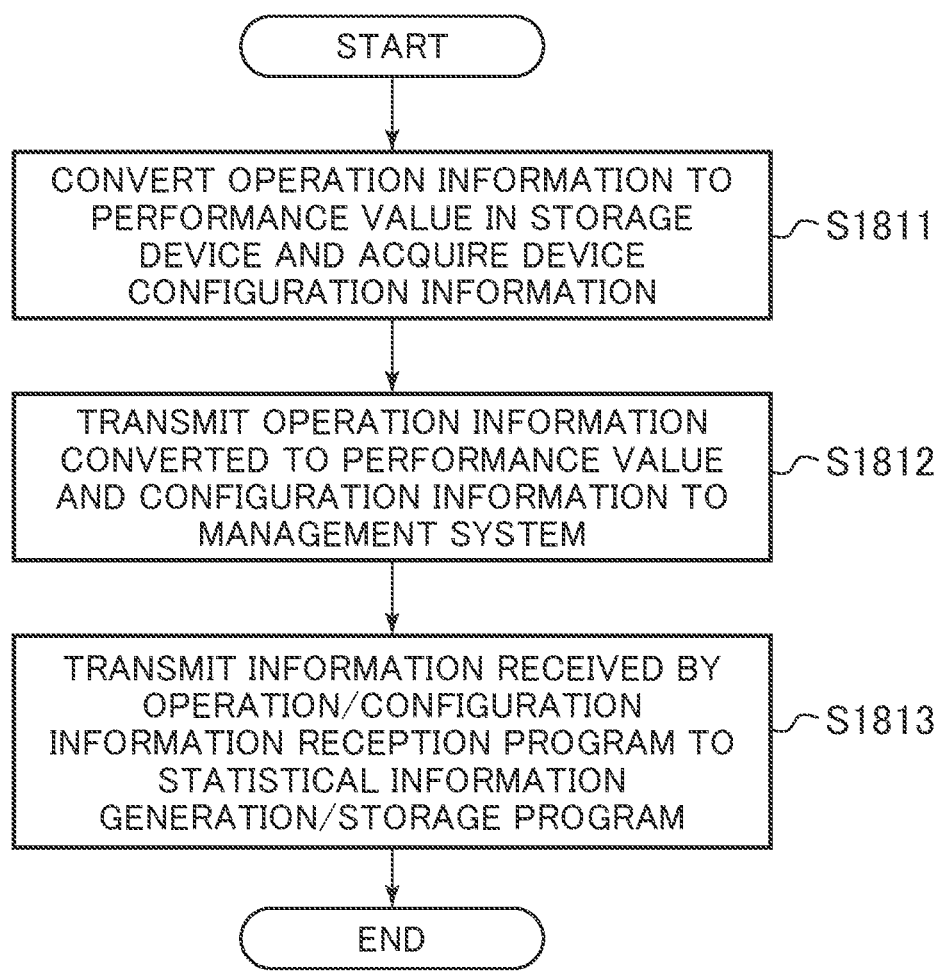
FIG. 16 is a flowchart of an information collection process according to the embodiment.

FIG. 16 is a flowchart of the information collection process according to the embodiment.

The information collection/storage program 60 of the storage device 50 acquires the configuration information of the configuration information table 63, converts a value of each metric that is a measured value of the operation information stored in the operation information table 62 into a value of a metric indicating a performance value to be stored in the operation history information table 21 to generate the operation information to be transmitted to the management system 10 (step S1811). In this case, as a method for converting the measured value into the performance value, the method described above in the explanation of the operation information table 62 illustrated in FIG. 5 can be used.

Next, the device information transmission program 61 of the storage device 50 transmits, to the management system 10, the configuration information and the operation information converted to the performance value (step S1812).

The operation/configuration information reception program 28 of the management system 10 receives the configuration information and the operation information, gives the configuration information and the operation information to the statistical information generation/storage program 29 (step S1813), and ends the process.

Next, the statistical information generation/storage process (step S1712) is described in detail.

Figure 17:
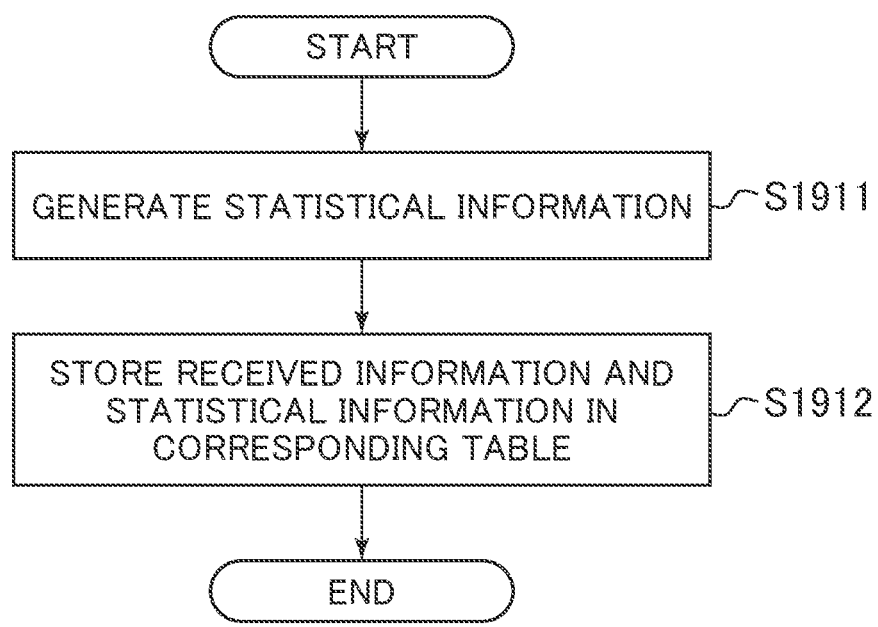
FIG. 17 is a flowchart of a statistical information generation/storage process according to the embodiment.

FIG. 17 is a flowchart of the statistical information generation/storage process according to the embodiment.

The statistical information generation/storage program 29 of the management system 10 converts the received operation information into the statistical information (step S1911). A method for converting the operation information into the statistical information is described later.

Next, the statistical information generation/storage program 29 causes the received operation information, the received configuration information, and the generated statistical information to be stored in the corresponding tables (operation history information table 21, device configuration information table 22, and device statistical information table 23) (step S1912) and ends the process.

Next, a method for generating the statistical information from the operation information is described.

Figure 18:
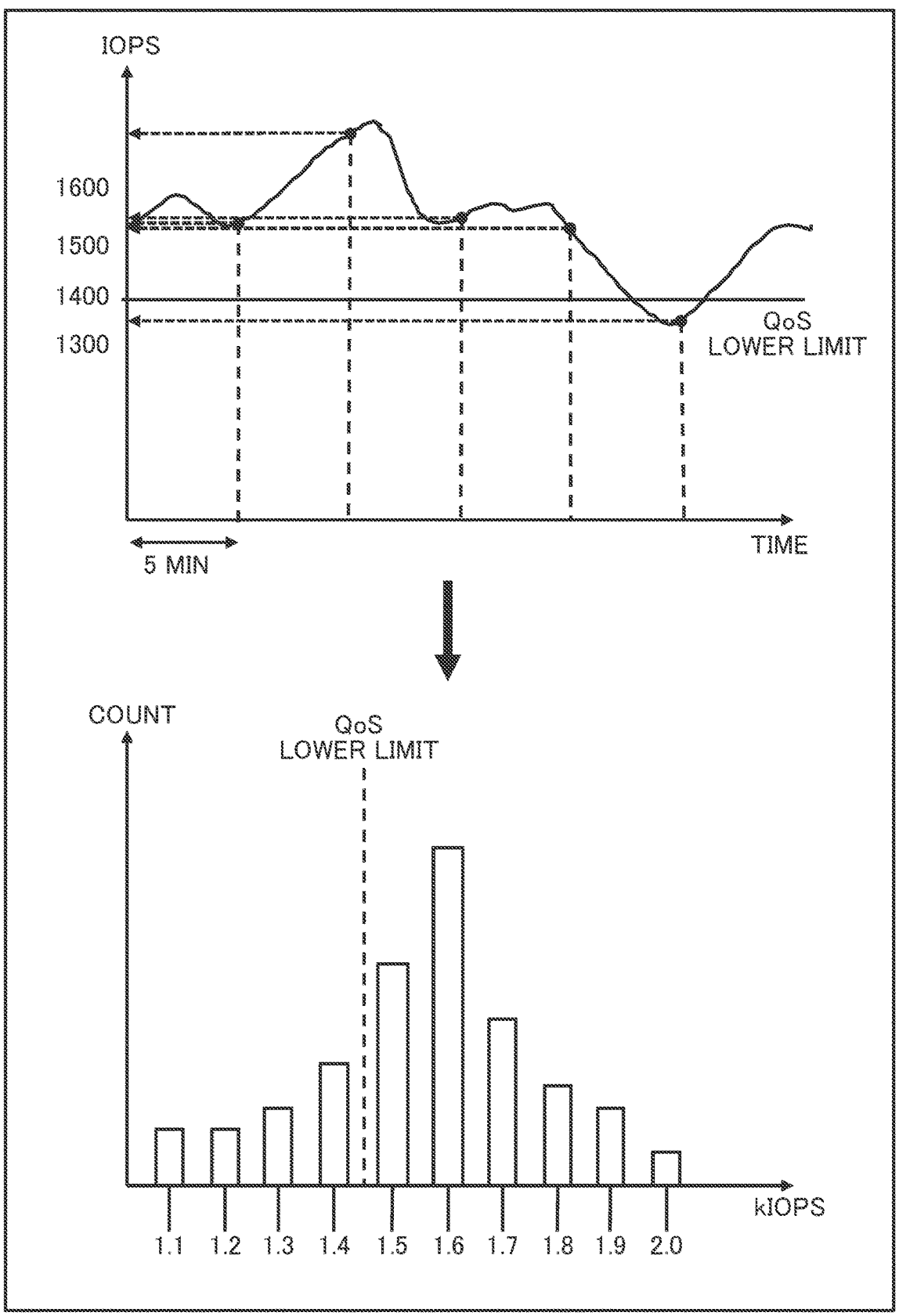
FIG. 18 is a diagram describing an example of the generation of statistical information according to the embodiment.

FIG. 18 is a diagram describing an example of the generation of the statistical information according to the embodiment. FIG. 18 illustrates an example in which values of metrics of the operation information are shown in a histogram (statistical information).

For example, when IOPS is monitored as the operation information in the storage device 50 every 5 minutes and transmitted to the management system 10, the statistical information generation/storage program 29 of the management system 10 adds a frequency value for a frequency interval corresponding to a value of the received IOPS based on a setting of a window (100 values of IOPS in the example of the drawing) of the frequency interval of the histogram of IOPS set in advance. According to this process, when the IOPS changes as illustrated in the upper diagram of FIG. 18, such a histogram as illustrated in the lower diagram of FIG. 18 can be generated.

According to this histogram, it is possible to determine that IOPS with a high frequency indicates long-term tendency of the operation information, and IOPS with an extreme value due to a temporal performance deviation can be treated as an outlier. The method for generating the histogram is not limited thereto. For example, frequency intervals of the histogram may be a fixed value or may not be a fixed value. When the frequency intervals are a fixed value, a value defined in the system in advance may be used. When the frequency intervals are not a fixed value, a value appropriate for the operation of the user may be set or a value set before the operation may be changed during the operation. In addition, an appropriate value may be determined and set by machine learning or the like. Although the example in which the operation information to be monitored is represented with IOPS is described, the subject to be monitored is not limited thereto. For example, another metric such as a transfer rate may be used as the subject to be monitored.

Next, the event detection process (step S1713) is described in detail.

Figure 19:
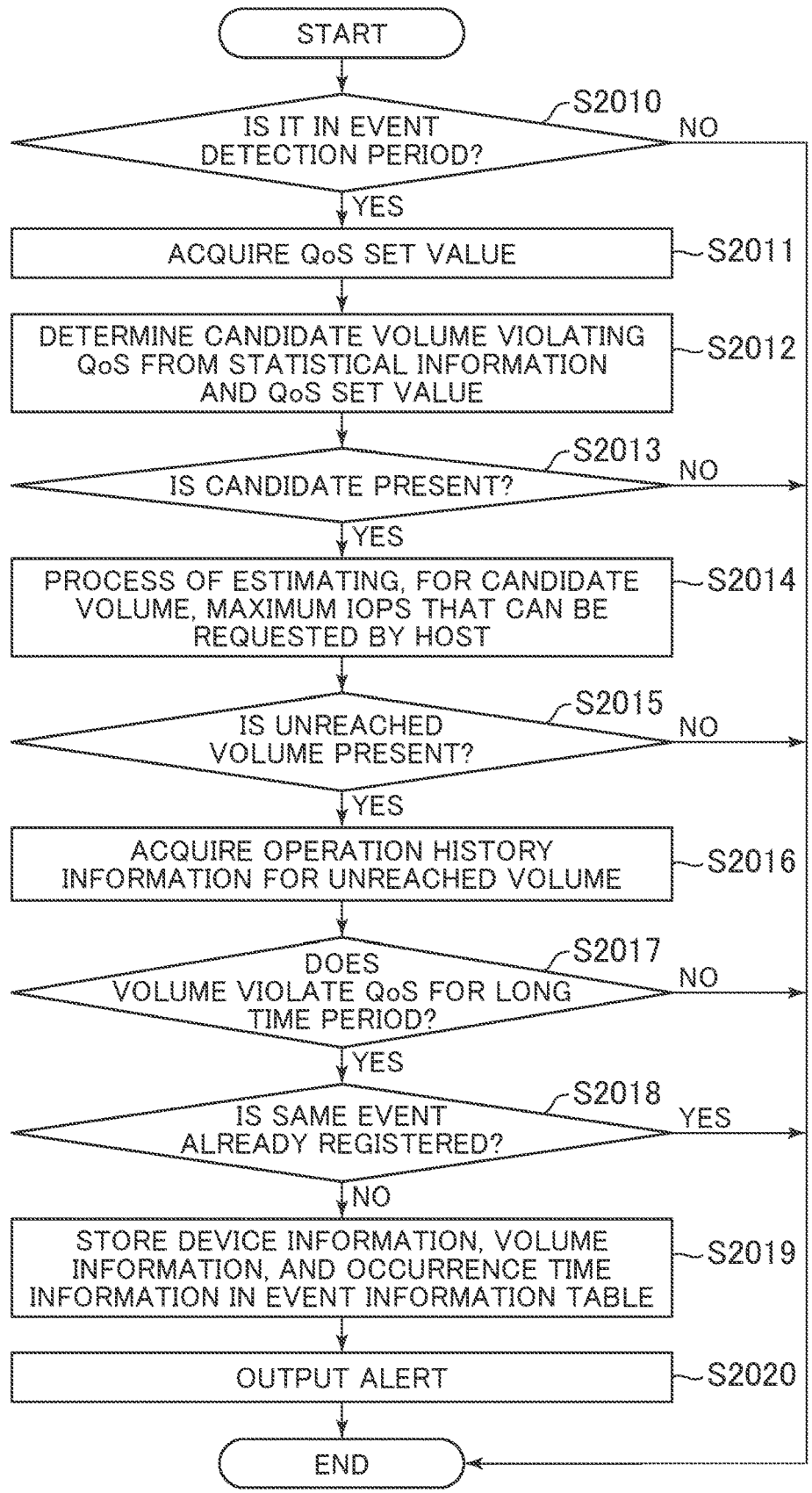
FIG. 19 is a flowchart of an event detection process according to the embodiment.

FIG. 19 is a flowchart of the event detection process according to the embodiment.

The event detection program 30 of the management system 10 references the detection information table 26, checks the statistical information generation period to be used for the process, and determines whether the event detection period is satisfied, that is, determines whether the statistical information generation period (for example, 1 day) has elapsed from the previous generation of statistical information for the statistical information generation period (step S2010).

When the statistical information generation period has not elapsed (No in step S2010), this means that statistical information for the statistical information generation period is not prepared, and the event detection program 30 ends the event detection process. Therefore, until the statistical information generation period elapses, it is not necessary to perform processes of steps S2011 and subsequent steps and it is possible to suppress the process cost of the management system 100.

On the other hand, when the statistical information generation period has elapsed (Yes in step S2010), this means that the statistical information for the statistical information generation period is prepared, and the event detection program 30 references the device configuration information table 22 and acquires a QoS set value (QoS lower limit) (step S2011).

Next, the event detection program 30 determines, based on the statistical information of the device statistical information table 23 and the acquired QoS set value, whether a volume 58 to be processed is a candidate for a QoS violation, thereby determining a candidate volume (candidate volume) for the QoS violation (step S2012). A method for determining whether the volume 58 to be processed is a candidate for the QoS violation is described later.

Next, the event detection program 30 determines whether the candidate volume determined in step S2012 is present (step S2013). When the candidate volume is not present (No in step S2013), the event detection program 30 ends the process.

On the other hand, when the candidate volume is present (Yes in step S2013), the event detection program 30 performs a process of estimating, for the candidate volume, the maximum IOPS (maximum IOPS) that can be requested by the host that uses the candidate volume for the QoS violation (step S2014). A process of estimating the maximum IOPS is described later.

Next, the event detection program 30 generates a histogram based on the estimated maximum IOPS that can be requested by the host, and determines whether a candidate volume (unreached volume) for which a reference value of the histogram is lower than a QoS lower limit is present (step S2015). When the candidate volume for which the reference value is lower than the QoS lower limit is not present (No in step S2015), the event detection program 30 ends the process.

On the other hand, when the candidate volume for which the reference value is lower than the QoS lower limit is present (Yes in step S2015), this means that this candidate volume is a QoS-violated volume, and the event detection program 30 acquires operation history information on the QoS-violated volume from the operation history information table 21 (step S2016).

Next, the event detection program 30 determines, based on the acquired operation history information, whether the QoS-violated volume violates QoS over a long time period (step S2017). In the present embodiment, whether the QoS-violated volume violates QoS is determined by determining whether this volume violates QoS over a detection period indicated in the detection period 26i of the detection information table 26.

When the event detection program 30 determines that the QoS-violated volume does not violate QoS over the long time period (No in step S2017), the event detection program 30 ends the process.

On the other hand, when the event detection program 30 determines that the QoS-violated volume violates QoS over the long time period (Yes in step S2017), the event detection program 30 notifies information of the QoS-violated volume to the event registration program 31, and the event registration program 31 checks whether an event that is the same as an event for the QoS-violated volume and is not solved (No in the solved 27j) is already registered in the event information table 27 (step S2018).

When the same event not solved is already registered in the event information table 27 (Yes in step S2018), this means that an alert is already output, and the event registration program 31 ends the process.

On the other hand, when the same event not solved is not registered in the event information table 27 (No in step S2018), the event registration program 31 causes information of the event, that is, device information, resource information, an abnormality detection time, and the like, which correspond to the QoS-violated volume, to be stored in the event information table 27 (step S2019).

Next, the event registration program 31 outputs, as an alert, the information of the event registered in step S2019 (step S2020) and ends the process. The alert may be output on a screen of the input/output device 15 of the management system 10.

Next, the determination of the maximum IOPS and the QoS violation is described.

Figure 20:
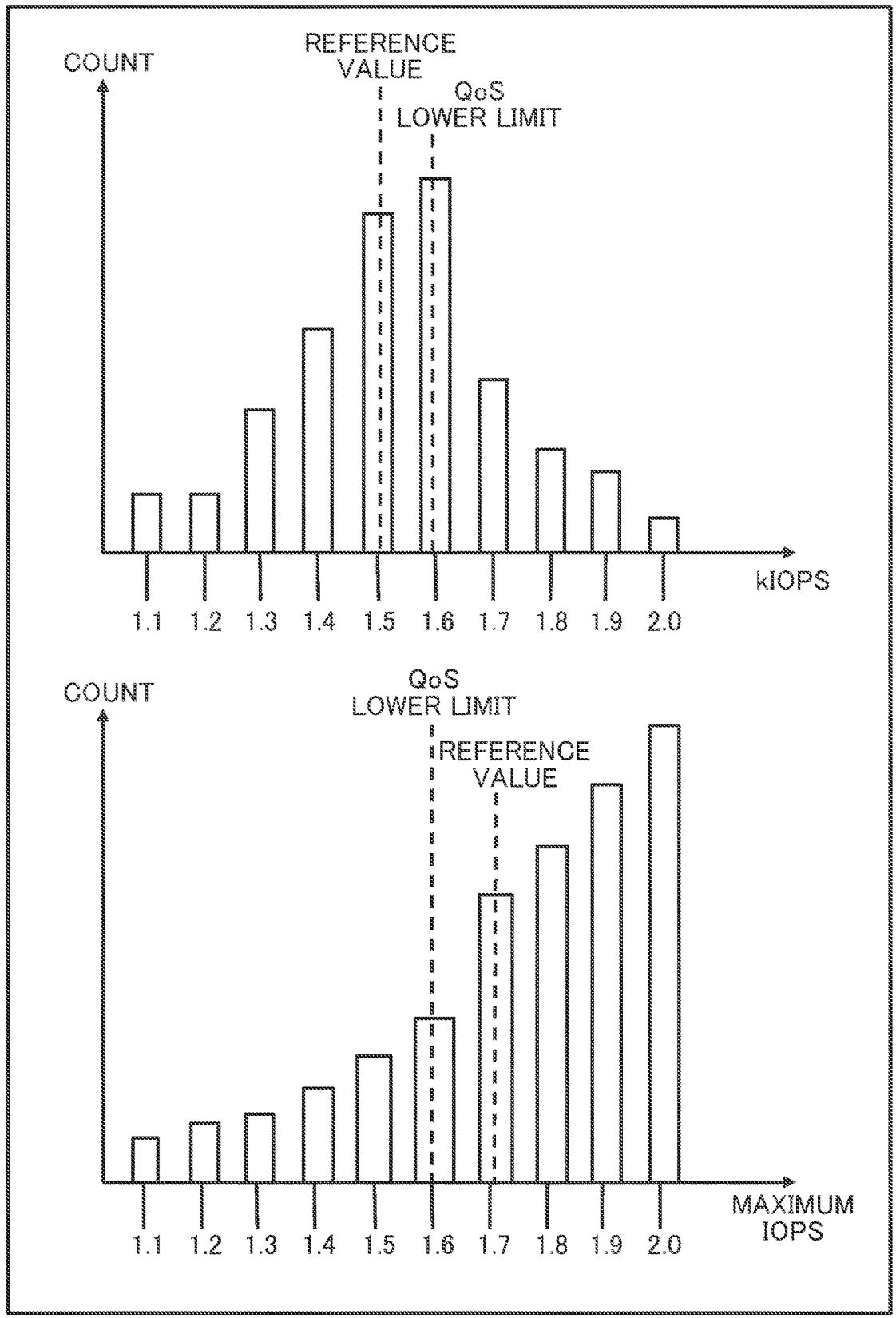
FIG. 20 is a diagram describing an example of the determination of a maximum IOPS and a QoS violation according to the embodiment.

FIG. 20 is a diagram describing an example of the determination of the maximum IOPS and the QoS violation according to the embodiment.

In step S2012, for example, a reference value (for example, a median) corresponding to the content of the reference value 26g of the detection information table 26 is calculated for the histogram (illustrated in the upper diagram of FIG. 20) generated using values of the IOPS transmitted from the storage device 50 every 5 minutes. When the reference value is lower than the QoS lower limit, it is determined that the target volume is a candidate volume for the QoS violation. Since the reference value of the volume indicated in the upper diagram of FIG. 20 is lower than the QoS lower limit, it is determined that the volume is a candidate volume that violates the QoS lower limit.

For example, when the median is used as the reference value, the median is robust against an outlier compared with the average value, the median less depends on a temporal abnormal value of the operation information and thus it is possible to detect a QoS violation in consideration of long-term tendency of the operation information.

However, as a situation in which a value of IOPS is lower than the QoS lower limit, the case where a QoS violation that does not satisfy the QoS lower limit due to insufficiency of a resource of the storage device 50 or a defective resource of the storage device 50 occurs, and the case where the host outputs only an I/O request corresponding to an IOPS value equal to or lower than the QoS lower limit and a QoS violation does not occur are considered.

In the present embodiment, to distinguish these cases and appropriately detect the former case as a QoS violation, the maximum IOPS that can be requested by the host is estimated using the following Equation (1). In the present embodiment, when measured IOPS (also referred to as actual IOPS) and the maximum IOPS are lower than the QoS lower limit, it is determined that a QoS violation occurs.

$$\text{The maximum IOPS}=(1/a \text{ response time})*IO \text{ multiplicity}=(1/\text{the response time})*\max(1,\text{the actual IOPS}*\text{the response time}) \quad (1)$$

In Equation (1), the reciprocal of the response time is the maximum value of IO that can be processed per second. The maximum IOPS that can be requested by the host can be estimated by multiplying the reciprocal of the response time by the IO multiplicity that is the number of times of IO issued by the host in parallel.

However, since the IO multiplicity depends on an application executed in the host, the IO multiplicity cannot be monitored by the management system 10. Therefore, it is necessary to estimate the IO multiplicity.

The IO multiplicity can be estimated using the following Equation (2).

$$\text{The } IO \text{ multiplicity}=\max(1,\text{the actual IOPS}*\text{the response time}) \quad (2)$$

Equation (2) indicates a larger value of 1 and the value obtained by multiplying the actual IOPS by the response time. Equation (2) is an equation based on the fact that the IO multiplicity cannot be 1 or less.

Since the actual IOPS and the response time are values that can be monitored by the management system 10, the management system 10 can use Equation (2) to estimate the maximum IOPS that can be requested by the host.

The operation information used to determine a QoS violation is not limited to IOPS. For example, transfer rates may be converted into a histogram as illustrated in FIG. 18 and a QoS violation may be determined using the same method as that illustrated in FIG. 20. When the transfer rates are used, the maximum transfer rate may be used instead of the maximum IOPS. The maximum transfer rate can be estimated using the following Equation (3), for example.

$$\text{The maximum transfer rate}=\text{the maximum IOPS}*\text{an average} IO \text{ length}=\text{the maximum IOPS}*(\text{an actual transfer rate}/\text{the actual IOPS}) \quad (3)$$

In Equation (3), the maximum IOPS is the value estimated using the Equation (1), and the average IO length is a value obtained by dividing the actual transfer rate by the actual IOPS.

In step S2015, such a histogram as illustrated in the lower diagram of FIG. 20 is generated for the estimated maximum IOPS in the same manner as the actual IOPS. Next, a reference value (for example, a median) corresponding to the content of the reference value 26g of the detection information table 26 is calculated for the histogram for the maximum IOPS. When the reference value is lower than the QoS lower limit, it is determined that a target volume violates QoS. Since the reference value of the volume indicated in the lower diagram of FIG. 20 is higher than the QoS lower limit, it is determined that the volume does not violate the QoS lower limit. Therefore, when the host outputs only an I/O request corresponding to an IOPS value equal to or lower than the QoS lower limit, it is possible to appropriately determine that the volume does not violate QoS.

The QoS violation detection process using the statistical information is not limited thereto. For example, as the reference value, the mode or the average value may be used instead of the median, or an index other than these values may be set based on the operation of the user. The reference value may be set before the operation and changed during the operation. In addition, as the reference value, an appropriate value may be determined and set by machine learning or the like.

The present invention is not limited to the embodiment described above and can be modified within the gist of the present invention as needed. For example, the aforementioned embodiment is described in detail to clearly explain the present invention and is not limited to the embodiment including all the configurations described above. Regarding some of the configurations described in the embodiment, a configuration can be added, removed, replaced, integrated, or distributed. The configurations and the processes described in the embodiment can be distributed, integrated, or replaced based on the process efficiency or the implementation efficiency.

In the embodiment, whether a QoS violation occurs within the detection period is determined and an alert is output for a volume that violates QoS over a long time period. However, the present invention is not limited thereto. For example, in step S2015, an alert may be output for a volume from which a QoS violation has been detected. In addition, in step S2012, an alert may be output for a candidate volume for a QoS violation.

What is claimed is:

1. A management system that manages one or more storage devices that provide, to a higher-level device, one or more volumes for inputting and outputting data, the management system comprising a processor,
wherein the processor collects performance information of a volume from the storage device at a predetermined first time interval and detects, based on the performance information, a quality-of-service (QoS) violation of the performance information of the volume at a second time interval longer than the first time interval,
wherein the processor generates, based on the performance information of the volume collected at the first time interval, statistical information on the performance information of the volume using the second time interval as a unit and detects the QoS violation of the performance information of the volume based on the statistical information,
wherein the performance information includes input/output per second (IOPS) that has occurred in the volume,
wherein the statistical information includes information obtained by converting the IOPS into a histogram,
wherein the processor detects the QoS violation of the performance information of the volume based on the information obtained by converting the IOPS into the histogram,
wherein the processor estimates, based on the IOPS, maximum IOPS that can be requested by the higher-level device, and
wherein the processor detects the QoS violation of the performance information of the volume based on the information obtained by converting the IOPS into the histogram and the information obtained by converting the maximum IOPS into the histogram.

2. The management system according to claim 1, wherein the statistical information is information obtained by converting the performance information collected at the first time interval into the histogram using the second time interval as a unit.

3. The management system according to claim 1, wherein the processor detects whether the volume is a candidate for the QoS violation based on the IOPS,
the processor estimates the maximum IOPS for the volume that is the candidate for the QoS violation, and
the processor detects the QoS violation of the performance information of the volume based on the information obtained by converting the maximum IOPS into the histogram.

4. The management system according to claim 1, wherein the processor detects one of the one or more volumes in which the QoS violation continues over a third time interval longer than the second time interval.

5. The management system according to claim 1, wherein when the processor detects the QoS violation of the performance information of the volume, the processor outputs an alert indicating that the QoS violation occurs.

6. The management system according to claim 5, wherein the alert includes information of one of the one or more volumes in which the QoS violation occurs, a storage device storing the volume in which the QoS violation occurs, a time when the processor detects the QoS violation.

7. The management system according to claim 1, further comprising a memory, wherein the memory stores the second time interval for each group using the volume.

8. A quality-of-service (QoS) violation detection method for detecting a QoS violation of a volume by a management system that comprises a processor and manages one or more storage devices that provide, to a higher-level device, one or more volumes for inputting and outputting data, the method comprising:
    causing the management system to collect performance information of the volume from the storage device at a predetermined first time interval; and
    causing the management system to detect the QoS violation of the performance information of the volume at a second time interval longer than the first time interval,
    wherein the processor generates, based on the performance information of the volume collected at the first time interval, statistical information on the performance information of the volume using the second time interval as a unit and detects the QoS violation of the performance information of the volume based on the statistical information,
    wherein the performance information includes input/output per second (IOPS) that has occurred in the volume,
    wherein the statistical information includes information obtained by converting the IOPS into a histogram,
    wherein the processor detects the QoS violation of the performance information of the volume based on the information obtained by converting the IOPS into the histogram,
    wherein the processor estimates, based on the IOPS, maximum IOPS that can be requested by the higher-level device, and
    wherein the processor detects the QoS violation of the performance information of the volume based on the information obtained by converting the IOPS into the histogram and the information obtained by converting the maximum IOPS into the histogram.

9. A quality-of-service (QoS) violation detection program to be executed by a computer that comprises a processor and manages one or more storage devices that provide, to a higher-level device, one or more volumes for inputting and outputting data, the program comprising:
    causing the computer to collect performance information of the volume from the storage device at a predetermined first time interval; and
    causing the computer to detect a QoS violation of the performance information of the volume at a second time interval longer than the first time interval,
    wherein the processor generates, based on the performance information of the volume collected at the first time interval, statistical information on the performance information of the volume using the second time interval as a unit and detects the QoS violation of the performance information of the volume based on the statistical information,
    wherein the performance information includes input/output per second (IOPS) that has occurred in the volume,
    wherein the statistical information includes information obtained by converting the IOPS into a histogram,
    wherein the processor detects the QoS violation of the performance information of the volume based on the information obtained by converting the IOPS into the histogram,
    wherein the processor estimates, based on the IOPS, maximum IOPS that can be requested by the higher-level device, and
    wherein the processor detects the QoS violation of the performance information of the volume based on the information obtained by converting the IOPS into the histogram and the information obtained by converting the maximum IOPS into the histogram.

* * * * *